June 11, 1929.
J. BILSKY
1,716,480
GAS ABSORBER FOR PRODUCTS OF COMBUSTION
Filed May 18, 1927
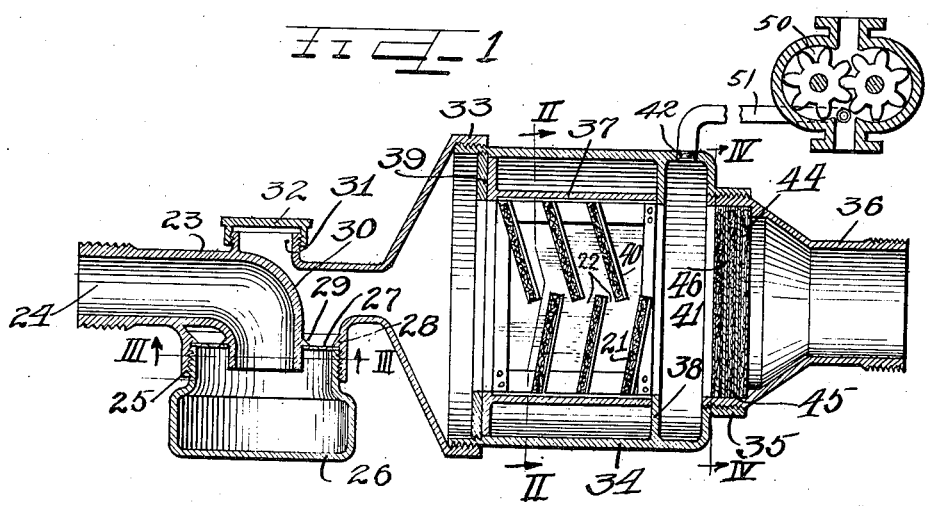
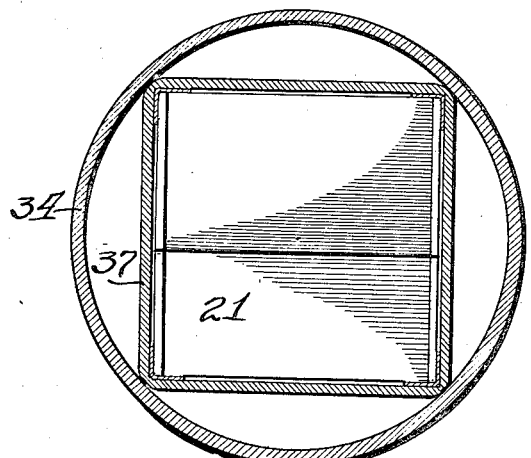
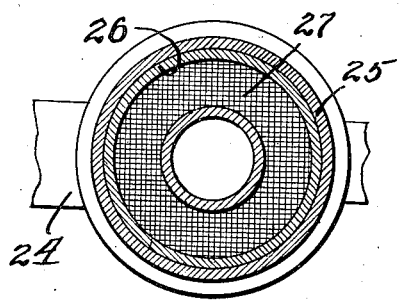
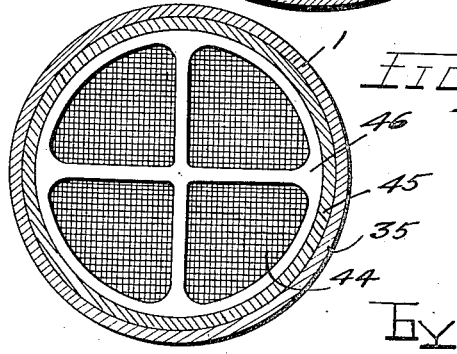
Inventor
Jacob Bilsky
By Charles Hill Atty Patented June 11, 1929.

1,716,480

UNITED STATES PATENT OFFICE.

JACOB BILSKY, NOW BY CHANGE OF NAME JOHN GREGORY BILLINGS, OF CHICAGO, ILLINOIS.

GAS ABSORBER FOR PRODUCTS OF COMBUSTION.

Application filed May 18, 1927. Serial No. 192,325.

This invention relates to a gas absorber for products of combustion and more particularly to a type of gas absorber suitable for use with internal combustion engines, either of the stationary type or of the type used in automobiles.

Owing to the great congestion of automobiles upon the streets of large cities, there exists a serious menace to the health of pedestrians from the obnoxious and poisonous fumes and smoke given off by the exhausts of these automobiles. The same health menacing conditions obtain in garages or any confined place where automobiles are allowed to keep their engines running.

It has, heretofore, been proposed to absorb the gas exhaust from automobiles by means of liquid or solid chemicals, but up to the present time no practical device has been perfected for this purpose. In general, the previous devices have been unsatisfactory, either for the reason that they would soon lose their efficiency due to the coating of the chemicals with oil or fuel residues, or due to the rapid neutralization of the effect of the chemicals by reaction with the gases. Furthermore, previous devices generally resulted in an objectionable back pressure due to the resistance offered to the flow of gases through the filtering device.

It is, therefore, an object of this invention to provide a gas absorber offering but little resistance to the flow of gases passing through, and provided with readily interchangeable means for holding gas absorbing chemicals of a dry and porous nature.

It is a further object of this invention to provide means for readily passing the exhaust gases around the gas absorber when it becomes unnecessary to absorb the exhaust gases.

It is a further object of this invention to provide means for reducing the obstruction offered by the gas absorbing device to the flow of gases therethrough and further to provide means for separating condensed and oily residues from the exhaust gases prior to their passage through the gas absorbing materials.

Other and important objects of this invention will become apparent from the following description and appended claim.

Of the drawings:

Figure 1 is a longitudinal sectional view of a preferred form of gas absorber

Figure 2 is an enlarged sectional view taken on line II—II of Figure 1.

Figure 3 is a sectional view taken on line III—III of Figure 1.

Figure 4 is a sectional view taken on line IV—IV of Figure 1.

In the illustrated form of my device, means are provided for removing the condensate and oily residues from the exhaust gases before the passage of said gas through the gas-absorbing device. At the inlet end of the device is provided a fitting 23, adapted to be attached to the end of an exhaust pipe, and providing an inlet passage 24 for the exhaust gases. The lower side of the fitting 23 is provided with a threaded aperture 25 for receiving a removable catch basin or trap 26. The passage 24 extends downwardly through the pipe 30 into the mouth of said catch basin 26 so as to direct the exhaust gases thereinto. A porous filter 27, preferably of wire gauze or similar perforate material, is adapted to be positioned between an annular shoulder 28 formed on the fitting 23, and the end of the catch basin 26. A shoulder 29, formed on the pipe 30, providing the passage 24, also serves to hold the filter 27 in position. An opening 31, closed by a threaded cap 32, is formed on the upper side of the fitting 23 for the purpose of providing access to the interior of said fitting.

Said fitting 23 terminates in an enlarged internally threaded cylindrical flange 33 adapted to receive the central portion 34 of the gas-absorbing device. Said central portion 34 is preferably cylindrical in form and provided with a reduced outlet end 35, for receiving an end section 36. A baffle supporting frame 37 is adapted to be inserted within the central chamber 34, and positioned against an internal flange 38 formed therein. A threaded retaining ring 39 holds said baffle supporting frame in place. Said frame 37 is provided with guides 40 for supporting hollow baffles 21 having foraminous walls for enclosing gas absorbing chemicals and arranged in staggered relation. The nature and composition of these gas absorbing chemicals is disclosed in my application, Serial No. 166,840, filed Feb. 9, 1927. The hollow baffles containing the chemicals, when placed in the guides 20, provide narrow passages 22 for the free passage of gas around and between said hollow baffles, thereby preventing objectionable back-pressure upon the engine. At the same time the passages 22 should be sufficiently restricted in size to cause the greater portion of the gases to pass through the hollow baffles in order that the full absorbing effect of the chemicals may be obtained. Between the internal annular flange 38 and the end of the section 34, there is provided an open chamber 41 for the expansion of the exhaust gases. Suction may be applied to said expansion chamber 41 through an aperture 42, in order to reduce the back pressure upon the engine and to provide sub-atmospheric conditions within the gas absorption chamber. Any suitable source of vacuum may be used, such as the oil pump usually found on automobiles, a conventional type of pump 50 being shown connected to said aperture 42 by means of a pipe 51.

A plurality of chemical-containing hollow baffles 44, preferably three in number, are adapted to be removably secured within the inner end 45 of the end section 36. Said baffles 44, which are of the same cross-sectional area as the opening in the end 45, are spaced apart by means of spacing rings 46, (Fig. 9). The chemicals contained in said hollow baffles 44, serve to absorb, fix, or otherwise react with the poisonous and obnoxious components of the exhaust gases not already absorbed by the chemicals in the gas absorption chamber of the central section 34. The nature of these chemicals is disclosed in my application, Serial No. 166,840, filed February 9, 1927.

I am aware that many changes may be made in the construction of my device without departing from the principles of this invention, and I, therefore, do not purpose to limit the patent granted hereon, otherwise than as necessitated by the prior act.

I claim as my invention:

A gas absorber apparatus for the exhaust gases of internal combustion engines, comprising a casing forming a reaction chamber having reduced inlet and outlet passages, means at the inlet end of said casing for directing entrained liquids out of the path of the exhaust gases entering said casing, a plurality of porous baffles arranged in open staggered relation within said casing, other perforated baffles closing the outlet of said casing, and means for creating sub-atmospheric pressure within said casing to reduce back pressure.

In testimony whereof I have hereunto subscribed my name at Chicago, Cook County, Illinois.

JACOB BILSKY.